United States Patent
Watson

[15] 3,650,684
[45] Mar. 21, 1972

[54] MANUFACTURE OF POTASSIUM METAPHOSPHATE

[72] Inventor: James W. Watson, Richmond, Va.

[73] Assignee: Swift & Company, Chicago, Ill.

[22] Filed: Dec. 10, 1968

[21] Appl. No.: 782,726

[52] U.S. Cl. ...................... 23/107, 23/106, 71/34, 71/43
[51] Int. Cl. ...................... C01b 25/30, C01b 25/38
[58] Field of Search ...................... 23/106, 107; 71/34, 43

[56] References Cited

UNITED STATES PATENTS

| | | | |
|---|---|---|---|
| 3,049,419 | 8/1962 | Raistrick et al. | 23/106 |
| 3,305,299 | 2/1967 | Cohen et al. | 23/165 |
| 3,399,032 | 8/1968 | Young | 23/107 |

FOREIGN PATENTS OR APPLICATIONS

| | | | |
|---|---|---|---|
| 776,576 | 1/1968 | Canada | 23/106 |
| 1,051,946 | 12/1966 | Great Britain | 23/106 |

Primary Examiner—Oscar R. Vertiz
Assistant Examiner—Gregory A. Heller
Attorney—Edward T. McCabe, C. E. Bouton, Jay C. Langston and W. C. Davis

[57] ABSTRACT

A process is disclosed for the manufacture of potassium metaphosphate by reacting potassium chloride with superphosphoric acid on a free flowing bed of inert solids under essentially anhydrous conditions.

4 Claims, No Drawings

MANUFACTURE OF POTASSIUM METAPHOSPHATE

This invention concerns an improved method of manufacturing alkali metal phosphates and more specifically, a process for the production of potassium metaphosphate.

Generally speaking, alkali metal phosphates are produced by reacting phosphoric acid with an appropriate alkali metal carbonate or alkali metal hydroxide which, in turn, must be first prepared from the alkali metal halide. In order to avoid the intermediate step of first forming the carbonate or hydroxide, attempts have been made to react phosphoric acid with the halide, e.g., potassium chloride. However, such attempts have not matured into commercial processes for several reasons. These are low yields, the need for high purity starting materials, excessive operating costs, corrosive nature of the reactants and products and the required high temperature, etc.

In one prior art process, potassium chloride and wet process phosphoric acid are reacted in a rotary kiln reactor operating at about 900° F. and that process overcomes the handicap of processing a solidified melt produced by stationary furnaces operating at about 1,650° F. In such a prior art process, a slurry of finely ground potassium chloride in conventional wet process phosphoric acid is reacted at about 900°–932° F. to produce potassium metaphosphate. Since water is a byproduct of the reaction, being present in the wet process phosphoric acid, steam along with gaseous hydrogen chloride evolve. Small quantities of condensed steam react with the gaseous hydrogen chloride to form aqueous hydrogen chloride and this byproduct possess an extremely corrosive nature at the exceedingly high temperatures utilized in the process.

Potassium metaphosphate is a highly concentrated plant food and in the pure form represents 100% plant food (0-60-40). However, its use as a food source for plants is severely limited because of its low water solubility. Additionally, in its usually produced form, it is generally contaminated with potassium chloride thus limiting its use on plants that are extremely sensitive to chloride ions, e.g., tobacco plants.

When potassium chloride is reacted with wet process phosphoric acid, hydrogen chloride, liberated in the form of a gas, dissolves in water present in the aqueous acid which in turn results in partial reformation of the potassium chloride. In some instances, excess wet process phosphoric acid has been used to insure reaction of all the potassium chloride while driving off gaseous hydrogen chloride. The disadvantage of such a procedure is that the resulting product is highly acidic and the free acid must then be neutralized with ammonia or other appropriate alkaline materials. Further, a fine balance must be maintained since contamination with excess acid causes condensed phosphates which in turn impart undesirable storage and other properties to the product.

It is therefore an object of this invention to produce potassium metaphosphate relatively free of chloride ion.

It is another object of this invention to form potassium metaphosphate using less energy requirements than prior art processes.

Additional objects, if not specifically set forth herein, will be readily apparent to those skilled in the art from the detailed description of the invention which follows.

Generally, the invention comprises the manufacture of potassium metaphosphate by reacting potassium chloride with superphosphoric acid on a free-flowing bed of inert solids under essentially anhydrous conditions. In more detail, the process comprises the steps of forming a rolling, cascading bed of solids flowing in a given direction; charging finely divided potassium chloride particles onto the bed of solids, contacting the potassium chloride particles with superphosphoric acid, usually in a reciprocating manner, whereby potassium metaphosphate is formed; withdrawing a quantity of in-situ produced potassium metaphosphate from the reaction zone; cooling and sizing the withdrawn material and recycling the fines to the reaction zone at a predetermined rate. Although the resulting potassium metaphosphate is water-insoluble, it is known that in the soil, the availability of the $P_2O_5$ and $K_2O$ is comparable to other conventional fertilizers. Potassium metaphosphate is nevertheless citrate-soluble and forms soluble complexes with clacium and magnesium cations.

The potassium metaphosphate of this invention is non-hygroscopic and non-caking without the need for a surface treatment or modification. It is easily handled in bulk and this freedom from caking permits the omission of coating or conditioning agents.

The potassium metaphosphate produced by this invention is completely compatible with other plant foods such as monoammonium phosphate, diammonium phosphate, ammonium nitrate, potassium sulfate, urea, ammonium sulfate, potassium nitrate, as well as chelating agents and other plant nutrients. As is obvious, combination with a nitrogen-source, plant food results in a complete plant food, i.e., one possessing nitrogen, phosphorous and potassium. Further, large amounts of the product can be utilized in growing plants without involving salt damage and its low chloride ion content is especially beneficial when highly sensitive-to-chloride-ion plants are to be fed.

More particularly, the present invention comprises the reaction of superphosphoric acid containing at least 66% $P_2O_5$ with commercial grade potassium chloride under conditions that ensure that not more than about 1% water, based on the total solids, is present during the course of the reaction. The solids upon which the superphosphoric acid and potassium chloride react are heated to a temperature somewhere less than about 325° C., and preferably less than 300° C. This relatively low temperature should be contrasted with what is believed to be the closest prior art process which demands that a temperature of above about 350° C., (preferably 500° C.) but below the fusion point of potassium metaphosphate is used.

In order to receive the benefits of this invention, superphosphoric acid having at least 66% APA and not more than 10% water is utilized. In this connection, APA is the term commonly used in the fertilizer industry to indicate available phosphoric acid content as phosphorous pentoxide. Superphosphoric acids of about 66–83% $P_2O_5$ can be employed advantageously in the process, although in the preferred form of the invention, superphosphoric acid containing about 75–77% $P_2O_5$ is utilized. Acid having 75% APA is equivalent to 103.5% orthophosphoric acid while 76% APA is equivalent to 105% orthophosphoric acid. More recently, an acid having 79–83% APA has become commercially available and this acid is equivalent to about 108–112% orthophosphoric acid.

Because the superphosphoric acid may be very viscous (about 780 centipoises at 80° F. as compared to about 17 centipoises at 80° F. for ordinary phosphoric acid) or may in fact even be a solid at room temperature, is desirable to reduce the viscosity thereof by heating. The viscosity of the superphosphoric acid varies with the strength of the acid and with temperature; and as a result, it is desirable to heat the acid to about 100°–150° F. so as to facilitate introduction of the acid into the granulator, and also to improve distribution of the acid during granulation. But it should be noted that even when the acid is heated, the acid is syrupy or tacky in nature. However, this quality of the acid is beneficial in granulation since it permits maximum agglomeration of the product. As the reaction proceeds, the syrupy or tacky nature of the acid promotes the concentration of fines and increases uniformity of particle size in the product.

Small amounts of water present adventitiously in any of the ingredients will be gathered in by the polyphosphoric components present in the superphosphoric acid. These polyphosphoric acid components react with water to form orthophosphoric or shorter chain acids. Accordingly, byproduct of reaction, namely hydrogen chloride, goes off as a gas with the effect that essentially none will go into solution which would cause some reformation of potassium chloride.

Manufacture of the dry granular potassium metaphosphate can be carried out in granulating equipment of the inclined drum type. Into the drum is charged sand or other inert solids or preferably potassium metaphosphate obtained from an earlier operation to form a starter material of inert, rolling, cascading bed of solids flowing in a given direction. Muriate of potash is charged into the drum and is contacted with the superphosphoric acid which is normally introduced into the reaction zone in a reciprocating manner. In order to reduce the viscosity the superphosphoric acid is heated to above 100° F. and preferably between 130°–160° F. so as to facilitate introduction of the acid to the granulator and also improve distribution of the acid during granulation. At least a stoichiometric amount of superphosphoric acid is employed to react with the potassium chloride. This 1:1 ratio should be maintained inasmuch as too much superphosphoric acid results in an acidic product necessitating neutralization with ammonia and, on the other hand, too little acid results in a product having excessive chloride ions.

As the materials react, heat is absorbed, decreasing the temperature of the granulating mixture. The liquid or semiliquid nature of the superphosphoric acid is readily decreased as the reaction proceeds and the resulting product can be described as hard, free-flowing granular particles. These particles are withdrawn from the drum, cooled and sized, and recycled to the drum at a rate of about 4–5 parts recycle for one part potassium metaphosphate produced.

While the actual granulating drum may be heated, it is preferred to pass the recycle material through a drier or kiln whereby the recycle material is heated to a temperature between about 275° C. and 325° C. While the potassium chloride and superphosphoric acid are generally at room temperature or slightly above, there is some slight heat loss when these products come in contact with the recycle material. However, due to the relatively large amount of recycle as compared to the amount of reactants, this heat loss is not noticeable nor apparent.

Since the reaction of this invention is essentially a solid-liquid reaction, the potassium chloride should be finely ground, say 90% should be 200 mesh or less. Commercial grades of potassium chloride are quite acceptable for use in the process.

The following examples are illustrative embodiments of the invention and are not to be taken in any manner as a limitation upon the invention.

EXAMPLE I

Potassium metaphosphate was prepared as the result of a series of 13 additions utilizing a rotating drum batch mixer starting with the following formula:

| | |
|---|---|
| KCl (recycle) | 1135 g. |
| Superphosphoric acid (69% $P_2O_5$) | 170 g. |
| KCl | 126 g. |
| Total | 1431 g. |

The recycle seed which was KCl at the start was charged into the rotating mixer which was then preheated to about 287° C. The superphosphoric acid at a temperature of 100°–120° F. and the KCl were added in six equal portions at 5-minute intervals. The total time needed to add the KCl and superphosphoric acid was approximately 20 minutes. The mixture was then allowed to react for about 15 minutes. The temperature of the reaction mixture was maintained at about 287° C., while adding the reactants. The product was then cooled and screened and the −6 mesh portion (1,135 g.) was used as recycle for the next series of additions. The acid and the KCl were added as before and in the same quantities. This process was repeated until 13 series of additions had been completed. Each time KCl and superphosphoric acid were reacted on the recycle, the composition gradually changed from 100% KCl, which was the initial charge, and approached $KPO_3$.

Samples of product were taken after each series of additions and sent to the lab for analysis and the 11th and 13th series are shown below:

Product After 11th Series

| | |
|---|---|
| APA | 50.78 |
| WSPA | 11.60 |
| IPA | 2.70 |
| TPA | 53.48 |
| $K_2O$ | 31.14 |
| Cl | 1.29 |

The final product after the 13th series of additions had the following analysis:

| | |
|---|---|
| APA | 51.52 |
| WSPA | 11.24 |
| IPA | 2.08 |
| TPA | 53.60 |
| $K_2O$ | 29.68 |
| Cl | 0.80 |

A similar method as described above was tried using sand as the initial charge of recycle. After each run the % of sand decreased as more and more $KPO_3$ was deposited from the KCl, Superphosphoric acid reaction.

EXAMPLE II

Potassium metaphosphate was prepared using the following formula in a rotating drum mixer:

| | |
|---|---|
| Recycle | 11,350 g. Sand ($SiO_2$) |
| Superphosphoric acid (71% $P_2O_5$) | 1,630 g. |
| KCl (61% $K_2O$) | 1,268 g. |
| Total | 14,248 g. |

The sand and the KCl were charged into the mixer and preheated to about 260° C. The superphosphoric acid was sprayed onto the rolling, cascading bed of solids at a rate which maintained the temperature at about 260° C. The reaction was allowed to continue until evolution of the gaseous HCl was completed. The mixture was then sampled and the product was used as recycle for the next step in the reaction series. The KCl was added in the same quantity as before (1,268 g.) to the mixer and preheated with the recycle to about 260° C. The reaction was repeated 3 times in the same manner, each time using the product obtained for recycle in the next reaction. Analysis of the product after the 1st reaction step is as follows:

| | |
|---|---|
| APA | 6.40 |
| W.S. P.A. | 3.64 |
| IPA | 0.12 |
| TPA | 6.52 |
| Water Soluble $K_2O$ | 4.95 |
| Acid Soluble $K_2O$ | 5.04 |
| F.A. | 0.00 |
| Cl | 1.27 |
| $SO_3$ | 1.38 |
| $SiO_2$ | 85.36 |

The analysis of the final product after the 4th reaction is given below:

| | | |
|---|---|---|
| APA | 18.48 | |
| W.S. P.A. | 8.30 | |
| IPA | 0.54 | |
| TPA | 19.02 | |
| Water Soluble $K_2O$ | 14.46 | |
| Acid Soluble $K_2O$ | 14.74 | |
| F.A. | 0.00 | |
| Cl | 3.38 | (30.4% total Cl introduced) |
| $SO_3$ | 1.23 | |
| $SiO_2$ | 60.14 | |

Obviously, many modifications and variations of the invention as hereinabove set forth may be made without departing from the spirit and scope thereof and, therefore, only those limitations should be imposed as are indicated in the appended claims.

I claim:

1. A method of manufacturing substantially water insoluble potassium metaphosphate which comprises the steps of forming a bed of potassium metaphosphate solids at a temperature between about 275° and about 325° C. and flowing in a given direction, charging finely divided potassium chloride particles onto the bed of solids, spraying the potassium chloride particles with superphosphoric acid whereby potassium metaphosphate is formed, and withdrawing a quantity of the in-situ produced potassium metaphosphate.

2. The method of claim 1 wherein the withdrawn potassium metaphosphate is cooled, sized and the fines are recycled to the flowing bed of solids.

3. The method of claim 1 wherein the superphosphoric acid is sprayed onto a rolling, cascading bed of potassium metaphosphate recycled at a rate of about 4–5 parts recycle for one part of potassium of metaphosphate produced.

4. The method of claim 1 wherein the bed of solids is recycled, potassium metaphosphate having a temperature of between about 275° C. and about 325° C.

* * * * *